June 7, 1932. H. J. MACKIN 1,861,606
BLIND
Filed Oct. 12, 1931
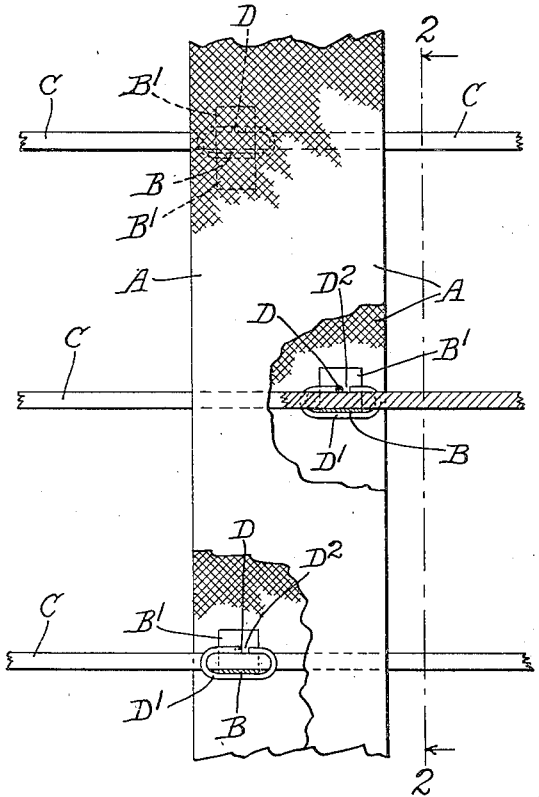
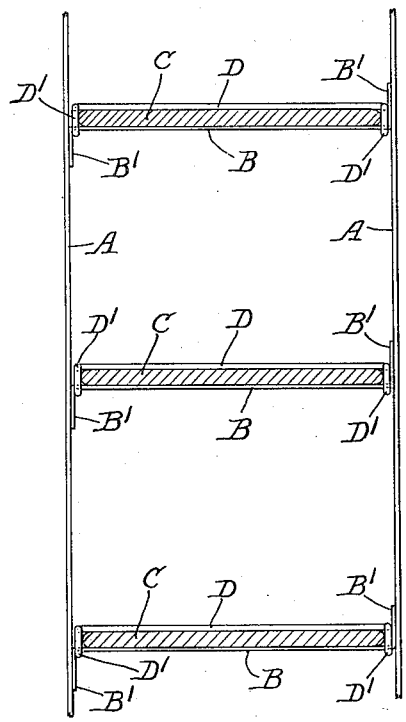
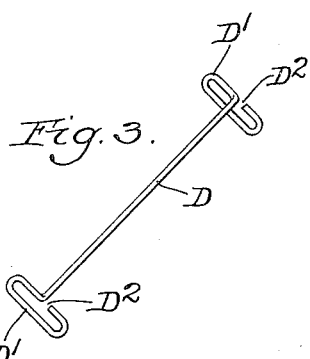
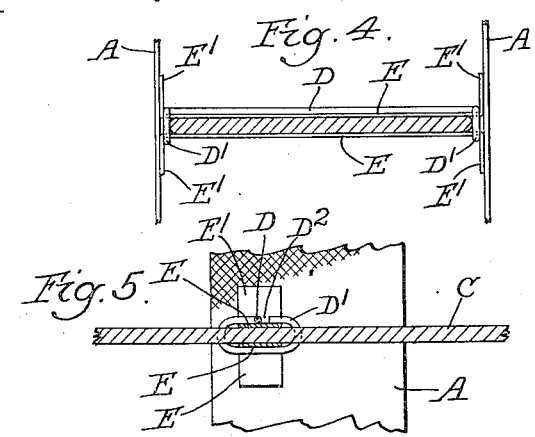
Inventor
Henry J. Mackin
by Parker + Carter
Attorneys Patented June 7, 1932

1,861,606

UNITED STATES PATENT OFFICE

HENRY J. MACKIN, OF KANKAKEE, ILLINOIS

BLIND

Application filed October 12, 1931. Serial No. 568,239.

This invention relates to a blind and particularly to a blind of the so-called "Venetian" type.

The invention has for one object to provide means for fastening the slats of a Venetian blind to prevent accidental displacement. Another object is to hold the slats so that they can have no movement apart from the blind as a whole.

Other objects will appear from time to time in the specification and claims.

My invention is illustrated more or less diagrammatically in the accompanying drawing, wherein—

Figure 1 is a side view of a portion of a Venetian blind, with parts broken away and parts in section;

Figure 2 is a sectional view taken on line 2—2 of Figure 1, showing the slats alone in section and the other parts of the blind in elevation;

Figure 3 is a perspective view of the fastening or clip member;

Figure 4 is a fragmentary cross section generally similar to Figure 2, and showing a modified form of slat support;

Figure 5 is a fragmentary elevation, generally similar to Figure 1, showing the modification of Figure 4, with parts in section and parts broken away.

Like parts are indicated by like characters throughout the specification and drawing.

A are main or vertical tape members. These are generally used in Venetian blinds in pairs and a blind may have one pair or more than one pair. Each of the main or vertical tapes is joined by a plurality of cross tapes B, B, which cross tapes are provided with upwardly or downwardly turned ends $B^1$ $B^1$ which engage the vertical tapes A and are fastened to them in any suitable manner. They may be sewn to them or woven into them or in any satisfactory manner fastened permanently to the side tapes A.

Resting upon each of the cross tapes B is a slat C. It will be seen that as thus formed, the slats rest upon the cross tapes by gravity only. When the side tapes are moved so that one rises with relation to the other, the cross tapes are correspondingly tilted and the slat carried by each cross tape is thus correspondingly tilted. In Venetian blinds, the tilting adjustment of the slats is accomplished by this relative movement of the side tapes A. Since the slats merely rest upon the cross tapes, they can be disturbed and moved out of position by any cause. Frequently they are blown out of position by a wind blowing into or out of the window in which the blind is positioned. To prevent displacement of the slats, I provide a clip or attaching member. In one form it comprises an extended shank D, whose length is approximately the same as the width of a slat. At each end of the shank D there is provided a hook $D^1$ which is preferably formed integrally with the shank D by bending a portion of it to form the hook. However it is formed, the hook is not closed so that there remains between the end of the hook and the shank an opening $D^2$.

In Figures 4 and 5 a modified form of blind is shown. In the form there shown the side tapes A, A are provided with a pair of cross tapes E, E, each of which has an upwardly or downwardly turned portion $E^1$, $E^1$ which is fastened to the side tape A. The cross tapes E are substantially the same as the cross tapes B of the form shown in Figures 1 to 3, inclusive. The main difference is that in the case of the modified form the cross tapes are provided in pairs, one just enough separated from another to permit the insertion between the two of a slat. This construction tends to reduce the likelihood of displacement of the slat, but does not fully accomplish this purpose and consequently my clip or fastener is used in connection with this type of tape arrangement just as it is in connection with the single tape arrangement shown in the earlier forms.

It will be realized that whereas I have herewith shown and described a practical operative device, nevertheless many changes might be made in the size, shape, number and disposition of parts, without departing from the spirit of my invention, and I wish, therefore, that my showing be taken as in a sense diagrammatic.

In particular the clip itself might be applied to many different sorts of Venetian blinds and it is to be understood that I have shown only two such types of blind. A further modification which I contemplate is a change in construction in the clip itself. Instead of making a unitary clip to run from end to end of the cross tape, two shorter clips might be used, one at each end of a cross tape.

The use and operation of my invention are as follows:

Ordinarily the blind is assembled with pairs of vertical or side tapes A joined by cross tapes B or E and upon the cross tapes are supported the slats C. With the parts in this position the clips are inserted, usually one for each cross tape. The hook portions $D^1$ of each clip are arranged to slip over one end of each cross tape at a point preferably adjacent the vertical tape A. With the hook portions $D^1$ thus engaging the cross tapes, the shank D of the clip is in a position substantially parallel to a cross tape and extending throughout its length and resting upon the slat C and holding it flat upon the cross tape. Thus since each slat is held to a cross tape, preferably adjacent the point of attachment of the latter to the vertical tapes, the slat cannot be blown or otherwise accidentally displaced from the cross tape and with the slats so held, any current of air blowing against the blind will possibly move it as a whole but will not displace or cause individual movement of the individual slats.

The form of the clip, of course, might be almost infinitely varied without departing from the spirit of my invention, because the important feature of the invention is the provision of means for positively fastening the slat against accidental displacement or movement away from the cross tape which supports it and this attachment is preferably at points closely adjacent to the side or vertical tapes A.

I claim:

1. In combination in a Venetian blind, a plurality of cross tapes, slats resting upon said cross tapes and means for fastening said slats against relative movement with respect thereto, said means including a clip member carrying a plurality of hooks, one adapted to engage a cross tape adjacent each of its ends.

2. In combination in a Venetian blind, a plurality of cross tapes, slats resting upon said cross tapes and means for fastening said slats against relative movement with respect thereto, said means including a spring clip member carrying a plurality of hooks, one adapted to engage a cross tape adjacent each of its ends.

3. In combination in a Venetian blind, a plurality of cross tapes, slats resting upon said cross tapes and means for fastening said slats against relative movement with respect thereto, said means including a clip member carrying a plurality of spring hooks, one adapted to engage a cross tape adjacent each of its ends.

4. In combination in a Venetian blind, a plurality of cross tapes, slats resting upon said cross tapes and means for fastening said slats against relative movement with respect thereto, said means including a spring clip member carrying a plurality of spring hooks, one adapted to engage a cross tape adjacent each of its ends.

5. In combination in a Venetian blind, a plurality of cross tapes, slats resting upon said cross tapes and means additional to the tapes for fastening said slats against relative movement with respect thereto, said means including a clip member carrying a plurality of hooks, one adapted to engage a cross tape adjacent each of its ends.

6. In combination in a Venetian blind, a plurality of cross tapes, slats resting upon said cross tapes and means additional to the tapes for fastening said slats against relative movement with respect thereto, said means including a spring clip member carrying a plurality of hooks, one adapted to engage a cross tape adjacent each of its ends.

7. In combination in a Venetian blind, a plurality of cross tapes, slats resting upon said cross tapes and means for fastening said slats against relative movement with respect thereto, said means including a clip member provided with a shank, approximately equal in length to the width of a slat, and carrying a plurality of hooks, one adapted to engage a cross tape adjacent each of its ends.

8. In combination in a Venetian blind, a plurality of cross tapes, slats resting upon said cross tapes and means for fastening said slats against relative movement with respect thereto, said means including a spring clip member provided with a shank, approximately equal in length to the width of a slat, and carrying a plurality of hooks, one adapted to engage a cross tape adjacent each of its ends.

9. In combination in a Venetian blind, a plurality of cross tapes, slats resting upon said cross tapes and means for fastening said slat against relative movement with respect thereto, said means including a spring clip member provided with a shank approximately equal in length to the width of a slat, and carrying a plurality of spring hooks, one adapted to engage a cross tape adjacent each of its ends.

10. In combination in a Venetian blind, a plurality of cross tapes, slats resting upon said cross tapes and means additional to the tapes for fastening said slats against relative movement with respect thereto, said means including a spring clip member provided with a shank approximately equal in length to the width of a slat, and carrying a plurality of hooks, one adapted to engage a cross tape adjacent each of its ends.

11. In combination in a Venetian blind, a plurality of cross tapes positioned so as to lie parallel with each other, slats resting upon said cross tapes and means additional to the tapes for fastening said slats against relative movement with respect thereto, said means including a clip member approximately equal in length to the width of a slat and carrying a plurality of hooks, one adapted to engage a cross tape adjacent each of its ends.

12. In combination in a Venetian blind, a plurality of cross tapes, the cross tapes positioned to lie parallel with each other, slats resting upon said cross tapes and means additional to the tapes for fastening said slats against relative movement with respect thereto, said means including a spring clip member provided with a shank approximately equal in length to the width of a slat, and carrying a plurality of hooks, one adapted to engage a cross tape adjacent each of its ends.

13. In combination in a Venetian blind, a pair of generally vertical supporting tapes, a plurality of cross tapes each fastened at each end to one of said vertical tapes, the cross tapes positioned so as to lie parallel with each other, slats resting upon said cross tapes and means additional to the tapes for fastening said slats against relative movement with respect thereto, said means including a spring clip member provided with a shank approximately equal in length to the width of a slat, and carrying a plurality of hooks, one adapted to engage a cross tape adjacent each of its ends.

14. In combination in a Venetian blind, a pair of generally vertical supporting tapes, a plurality of cross tapes each fastened at each end to one of said vertical tapes, the cross tapes positioned so as to lie parallel with each other, slats resting upon said cross tapes and means additional to the tapes for fastening said slats against relative movement with respect thereto, said means including a spring clip member provided with a shank approximately equal in length to the width of a slat, and carrying a plurality of spring hooks, one adapted to engage a cross tape adjacent each of its ends.

15. In combination in a Venetian blind, a plurality of cross tapes adapted to support slats, slats resting upon them and means for fastening each slat against relative movement with respect to the tape which supports it.

16. In combination in a Venetian blind, a plurality of cross tapes adapted to support slats, slats resting upon them and means, additional to the tape, for fastening each slat against relative movement with respect to the tape which supports it.

17. In combination in a Venetian blind, a plurality of cross tapes adapted to support slats, slats resting upon them and means for fastening each slat against relative movement with respect to the tape which supports it, said means including parts adapted to engage each slat to the tape which supports it at points adjacent the ends of said tape.

Signed at Kankakee, county of Kankakee and State of Illinois, this 9th day of October, 1931.

HENRY J. MACKIN.